(12) United States Patent
Seiwald

(10) Patent No.: US 11,785,679 B2
(45) Date of Patent: Oct. 10, 2023

(54) ROTARY INDUCTION HEATER HAVING A DIRECT-CURRENT EXCITER

(71) Applicant: NT-Design Forschung & Entwicklung, Söll (AT)

(72) Inventor: Andreas Seiwald, Söll (AT)

(73) Assignee: NT-Design Forschung & Entwicklung, Söll (AT)

( * ) Notice: Subject to any disclaimer, the term of this patent is extended or adjusted under 35 U.S.C. 154(b) by 851 days.

(21) Appl. No.: 16/472,451

(22) PCT Filed: Dec. 22, 2017

(86) PCT No.: PCT/EP2017/084555
§ 371 (c)(1),
(2) Date: Jun. 21, 2019

(87) PCT Pub. No.: WO2018/115521
PCT Pub. Date: Jun. 28, 2018

(65) Prior Publication Data
US 2020/0187310 A1    Jun. 11, 2020

(30) Foreign Application Priority Data

Dec. 22, 2016   (DE) .................. 102016125500.9

(51) Int. Cl.
| | |
|---|---|
| H05B 6/10 | (2006.01) |
| H02K 9/197 | (2006.01) |
| H02K 49/04 | (2006.01) |

(52) U.S. Cl.
CPC ............ H05B 6/109 (2013.01); H02K 9/197 (2013.01); H02K 49/043 (2013.01)

(58) Field of Classification Search
CPC ...... H02K 49/043; H02K 9/197; H05B 6/108; H05B 6/109
See application file for complete search history.

(56) References Cited

U.S. PATENT DOCUMENTS

| | | |
|---|---|---|
| 3,014,116 A | 12/1961 | MacArthur |
| 4,423,344 A | 12/1983 | Jones |
| (Continued) | | |

FOREIGN PATENT DOCUMENTS

| | | |
|---|---|---|
| CN | 201114850 | 9/2008 |
| CN | 102348299 | 2/2012 |
| CN | 103313449 | 9/2013 |
| (Continued) | | |

OTHER PUBLICATIONS

International Search Report for Application No. PCT/EP2017/084555 dated Mar. 20, 2018.
(Continued)

*Primary Examiner* — Naishadh N Desai
(74) *Attorney, Agent, or Firm* — Eugene LeDonne; Haug Partners LLP

(57) ABSTRACT

The invention relates to a rotary induction heater with direct-current excitation for heating solid or liquid or gaseous substances. The alternating magnetic field required for induction or for generating inductive heat is generated with a direct-current coil having a constant magnetic field. The constant magnetic field is converted into an alternating magnetic field by way of a rotating mechanical component.

8 Claims, 12 Drawing Sheets

(56) References Cited

U.S. PATENT DOCUMENTS

2014/0110938 A1* 4/2014 Okazaki .................... F03D 9/25
                                                  290/2
2014/0231414 A1* 8/2014 Nelson ................... H05B 6/109
                                                  219/628

FOREIGN PATENT DOCUMENTS

| CN | 103621176 | 3/2014 | | |
|----|-----------|--------|---|---|
| DE | 2620236 | 11/1977 | | |
| DE | 31 29 817 | 2/1983 | | |
| EP | 0 062 706 | 10/1982 | | |
| EP | 0 071 046 | 2/1983 | | |
| FR | 2536943 | 6/1984 | | |
| FR | 2864369 | 6/2005 | | |
| JP | 2011-216325 | 10/2011 | | |
| WO | WO 2008/028673 | 3/2008 | | |
| WO | WO-2008028673 A1 * | 3/2008 | ........... | H02K 49/043 |
| WO | WO 2011/125485 | 10/2011 | | |
| WO | WO-2011125485 A1 * | 10/2011 | ............. | F03D 9/002 |

OTHER PUBLICATIONS

Notification of the Chinese First Office Action for corresponding application No. 201780080326.1 dated May 17, 2021.
Chinese Search Report for Application No. 201780080326.1 dated May 10, 2021.
EP office action for corresponding application No. 17822328.5 dated Jul. 2, 2020.

* cited by examiner a) b)

Example from FEM simulation with VectorFields Opera 3D Carmen software, ratio of driving torque to braking torque in ratio of 1:3.45 in favor of braking

ROTARY INDUCTION HEATER HAVING A DIRECT-CURRENT EXCITER

The present application is a national stage entry, under 35 U.S.C. 371, of International Application No. PCT/EP2017/084555 filed on Dec. 22, 2017, which claims priority from German Application No. 10 2016 125 500.9 filed on Dec. 22, 2016, the disclosures of which are incorporated by reference in their entireties.

FIELD OF THE INVENTION

The invention relates to a heating system (see for example FIG. 1, items 1-9) in which the thermal energy is generated by means of magnetic induction in the form of eddy currents by way of direct-current excitation and a mechanical device (see for example FIG. 5, items 30-32) for generating the alternating magnetic field. The heating system can be used for generating hot water of heating systems of all kinds and also for heating service water.

BACKGROUND

Eddy currents are short-circuit currents that convert electrical energy into thermal energy in an electrical conductor. Apart from small convection losses, this energy is transferred 100% into a solid, liquid (oil is preferred) or gaseous heat transfer medium.

There are already known heating systems in which thermal energy is generated by eddy currents. These include for example induction furnaces or induction hobs.

The thermal energy is generated here exclusively in the medium to be heated. The medium forms the magnetic or electrically conducting bridge to the heating unit, where as a consequence eddy currents heat the medium. Only minor hysteresis and eddy current losses are found to occur in the heating unit itself.

In order that said systems can function, alternating current (or alternating voltage) must be applied to the excitation coils.

This alternating current generates an alternating magnetic field in the coils, inductive currents being generated and counteracting the applied current on the basis of the known induction law.

Certain technical measures are necessary for this, such as magnetic cores of thin stacked and insulated metal sheets with poor electrical conductivity or ferrite cores with high electrical resistance to eddy currents, and also coils with a low number of turns and low ohmic resistance to inductive reactance. The exact way in which alternating current coils operate is not discussed here any more specifically; they do not bear any relation to the actual invention.

Apart from heating systems described above, in which mention should be made of eddy current brakes, which similarly generate thermal energy in the region, eddy currents are generated. Here, too, the same problem is found. Although eddy current brakes are operated with direct current and have a high electrical efficiency, they require an equivalent kinetic energy for generating the thermal energy or to keep the system in motion.

This means in the case of all the systems mentioned that the electrical and/or kinetic energy to be introduced is in this way greater than the usable thermal energy. These heating systems do not allow any energy saving and are little suited or not suited for generating heat in the area of heating and service water.

As prior art, reference is made to DE 2620236 A1, DE 2647741 A1, FR 2864369 A1, WO 2008028673 A1, EP 0 071 046, US 2014/0231414, DE 31 29 817, U.S. Pat. No. 4,423,344, and EP-A2-0 062 706. The known systems have not been widely adopted so far on account of their inadequate efficiency, and, because of the disadvantageous structural set-up, the systems are also often only designed for relatively small power outputs, in particular for use in vehicles, as vehicle heating.

SUMMARY OF THE INVENTION

The object of the invention is to avoid disadvantages of these known heat generators and provide a heating system (FIG. 3, items 17-27) with much greater energy efficiency, and consequently a far better efficiency, also a heating system with a power output of more than 10, preferably more than 20 or 50 kW or 100-500 kW.

The object is achieved according to the invention by a rotary induction heater according to claim 1; advantageous developments are described in the subclaims.

The invention is based on the realization that not that alternating magnetic field required for induction is generated by way of an excitation coil by means of alternating current, but by means of direct current, the excitation coil preferably not rotating but being statically fixed.

Direct-current coils have an inductive reactance many times lower than alternating current coils. That allows the low excitation current and many turns. This results in the magnetic potential (vector potential) being equivalent to current×turns. High excitation current and few turns, for example 100 A×1 N=100 AW or low excitation current and many turns, for example 1 A×100 N=100 AW, is the same quantity. Because the constant magnetic field does not generate any induction, the invention is described below.

BRIEF DESCRIPTION OF THE DRAWINGS

The figures show one possible exemplary embodiment of the invention and thereby.

DETAILED DESCRIPTION OF THE INVENTION

Figure 1:
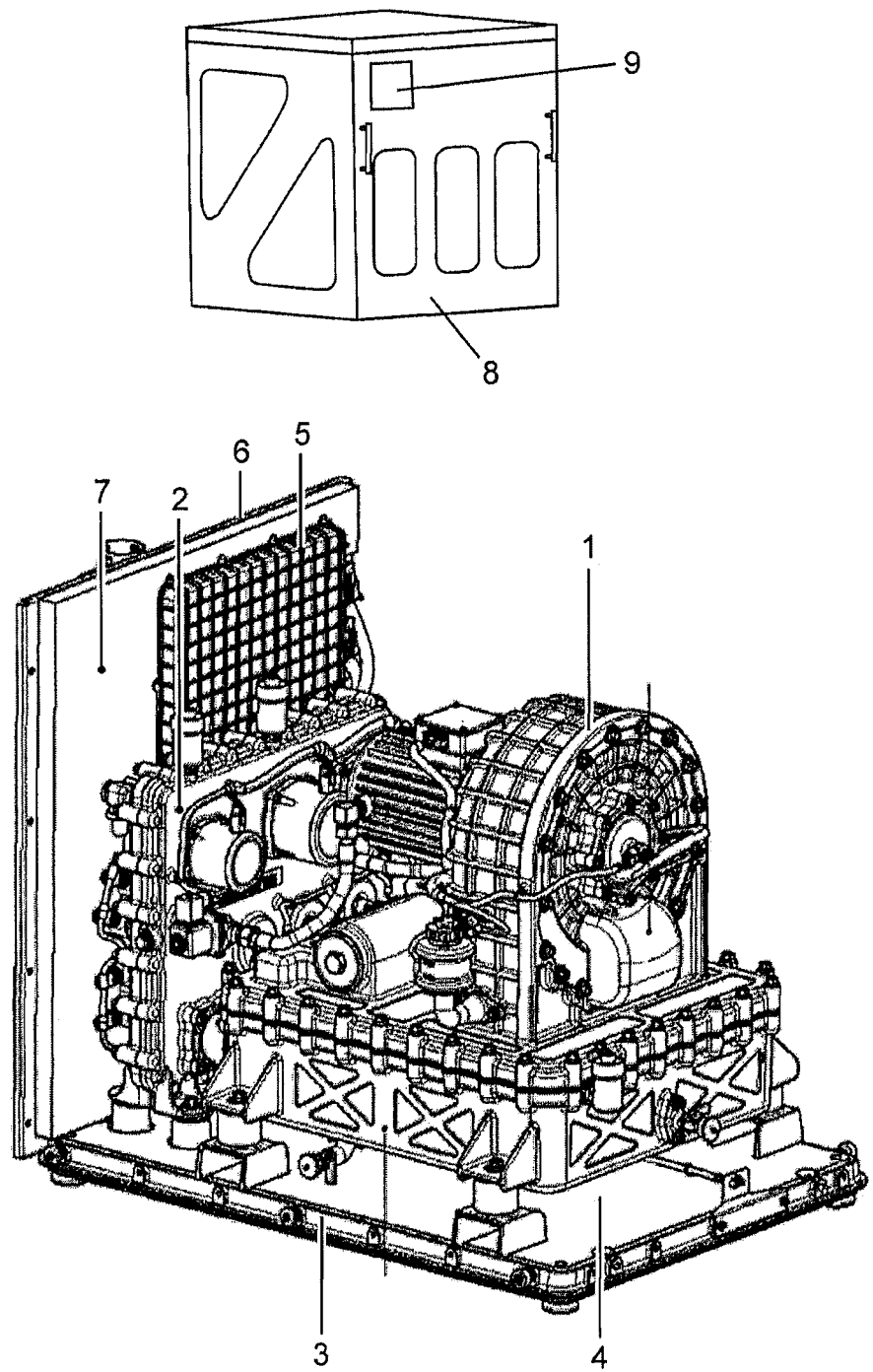
FIG. 1 shows a plan view of a rotary induction heater according to the invention with a heat-insulating and sound-damping hood removed from it.

FIG. 1 shows a basic set-up of the heating device 1 according to the invention and a heat exchanger connected thereto, a mixing box 2 for providing hot/cold water. As can be seen in FIG. 1, in this case all of the parts of the device are received by a basic frame 3. This basic frame has a heat-insulating and sound-damping mat 4 and the device as represented in FIG. 1 may have a heat-insulating and sound-damping hood placed over it, the hood having an indicating and operating element 9 and the hood as such also having a door that can be removed or opened. As can also be seen in FIG. 1, the heating unit has on the rear side a rear wall 6, which is likewise provided with a heat-insulating and sound-damping mat on the rear wall, and the unit also has control electronics 5.

Figure 2:
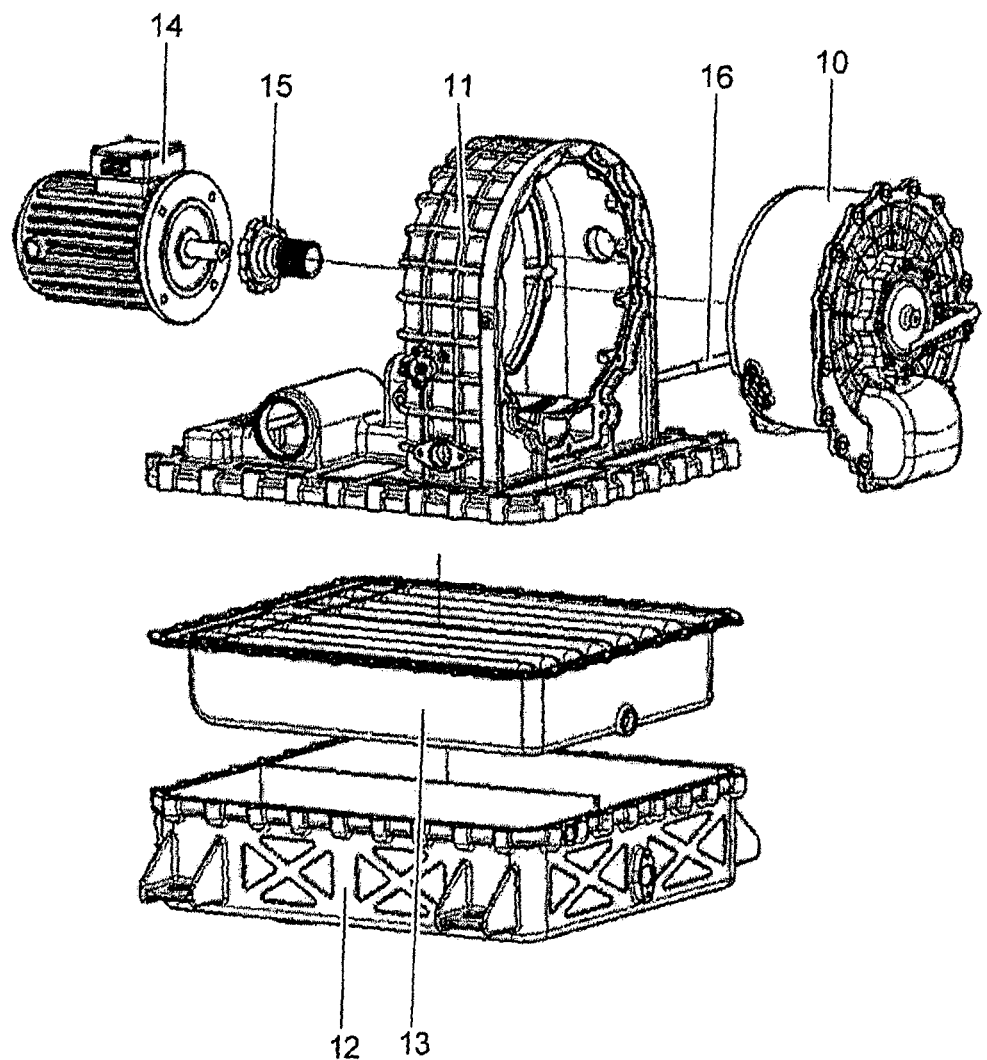
FIG. 2 shows an exploded representation of essential parts of the rotary induction heating unit according to the invention as shown in FIG. 1.

FIG. 2 shows an exploded representation of some of the parts of the heating device according to the invention as shown in FIG. 1. The figure shows in this case a lower heat exchanger housing 12, an oil-water separator 13, an upper heat exchanger housing 11, a heating unit 10, a controller for oil injection volume 16, a starting motor 14 as a typical drive, and also a coupling for connecting the heating unit 10 and the starting motor 14.

Figure 3:
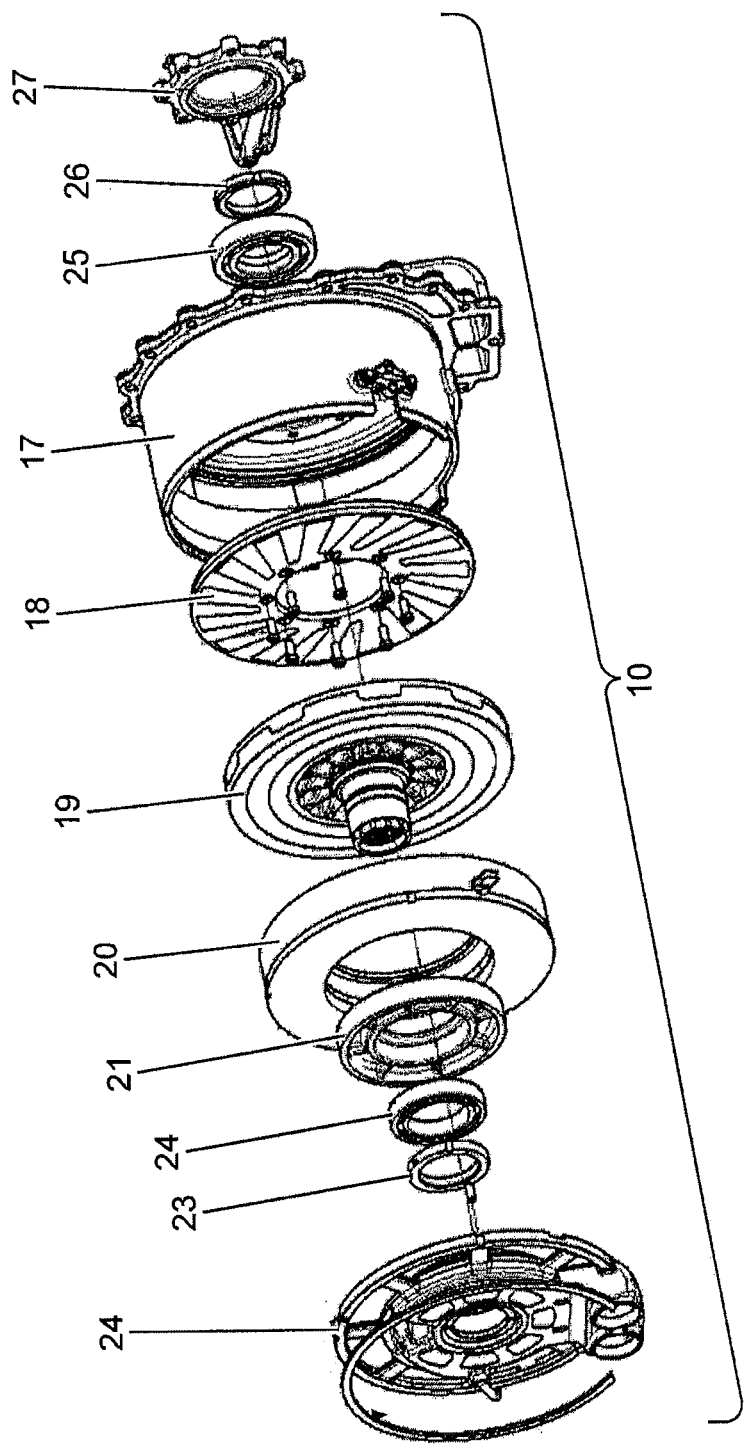
FIG. 3 shows an exploded representation of the heating unit according to the invention.

FIG. 3 shows in an exploded representation details of the heating unit 10 from an image represented, consisting of (from left to right) an oil pump 24, a supporting bearing 22, a clamping nut of the supporting bearing 23, a supporting bearing hub 21, and a magnetic ring with a direct-current coil 20 (stationary), a pole wheel 19 (rotating), an induction ring 18 (stationary), a housing 17 of the heating unit 10, a guiding bearing 25 and a clamping nut of the guiding bearing 26, and also a front cover 27.

The particular way in which the set-up of the magnetic ring, the pole wheel and the induction ring 18 functions is as explained below.

According to the invention, the direct-current coil 29 is received in a magnetic ring 28, is preferably firmly connected thereto, the magnetic ring being fixedly connected to the housing 17 of the rotary induction heater 1 and the constant magnetic field generated by the direct-current coil being converted into an alternating magnetic field 52 by way of a rotating mechanical component, to be specific the pole wheel 19.

According to the invention, it is provided that the inducing part, the magnetic ring 28, is formed by a cross-sectionally U-shaped ring and consists of ferromagnetic material, pure iron is preferred, a slot 87 being formed by the U-shaped ring. Placed in the slot is the direct-current coil 29, which is similarly formed in the form of a ring. The direct-current coil comprises a coil, for example a wound coil, which may consist of a sheet metal strip, a round wire or a rectangular wire. On account of the constant magnetic field, the magnetic ring 28 may consist of solid material, stacked metal sheets or sintered metal. The magnetic ring has an inner and an outer uninterrupted planar surface (FIG. 4, item 28), where the magnetic field alternately leaves, for example as a south pole and as an opposite pole, for example north pole, and enters again in structurally identical surfaces from the adjacent pole wheel (FIG. 5, items 30-32). According to the invention, it is alternatively also conceivable to insert a permanent magnet into the magnetic ring instead of the direct-current coil for the magnetization. Disadvantage of permanent magnets are possibly high production costs, low Curie temperature and complex control technology of the heating output.

Figure 4:
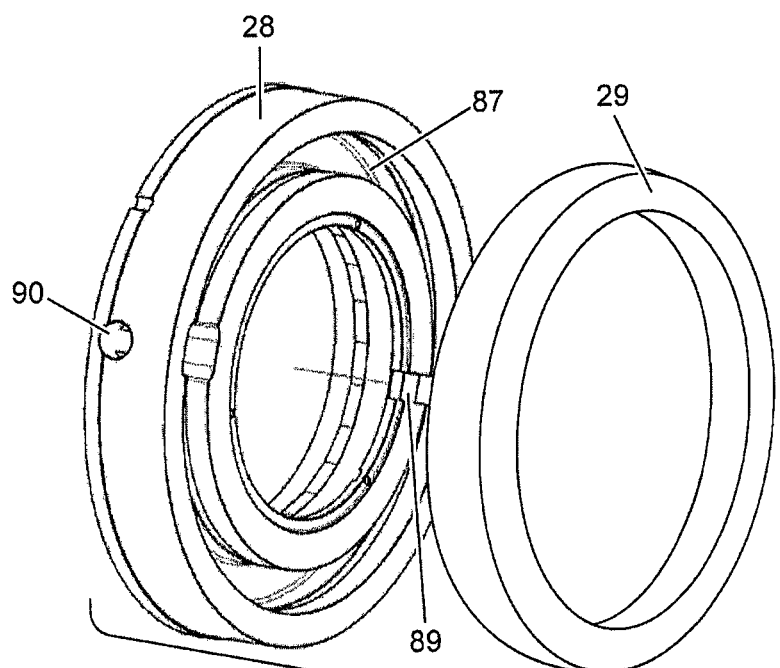
FIG. 4 shows an exploded representation of the magnetic ring on the one hand and the direct-current coil on the other hand.
Figure 5:
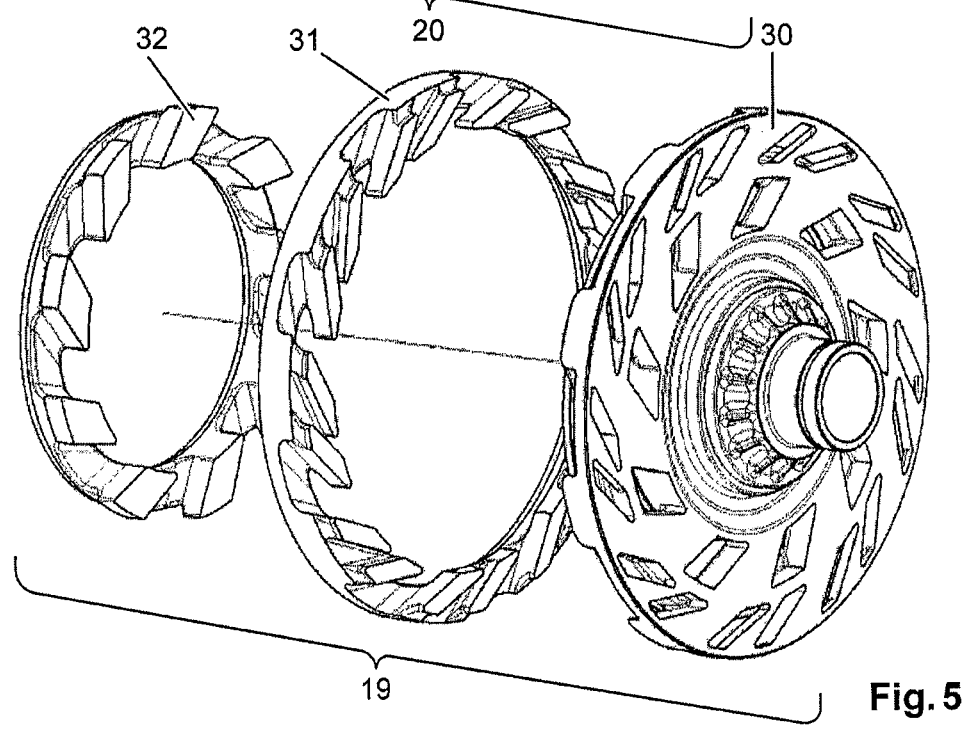
FIG. 5 shows an exploded representation of a pole wheel, consisting of an inner pole ring, an outer pole ring and a pole ring carrier.

FIG. 4 is also shown a power supply terminal 89 of the direct-current coil 29, which is led to the outside through an opening 90 in the magnetic ring 28, in order in this way to make a connection to an electrical power system possible.

In order to convert the constant field into an alternating field required for the induction, the invention provides a mechanical component, the pole wheel (FIG. 5, items 30-32). If the pole wheel rotates past the static (that is to say stationary) magnetic ring, this prerequisite is satisfied.

The pole wheel preferably consists of a number of components, for example an inner pole ring (FIG. 5, item 32), an outer pole ring (FIG. 5, item 31) of ferromagnetic material, preferably of pure iron, and the pole ring carrier (FIG. 5, item 30) of for example antimagnetic material, for example stainless steel or plastic. The pole rings may consist of solid material, stacked metal sheets or ferrite.

Figure 6:
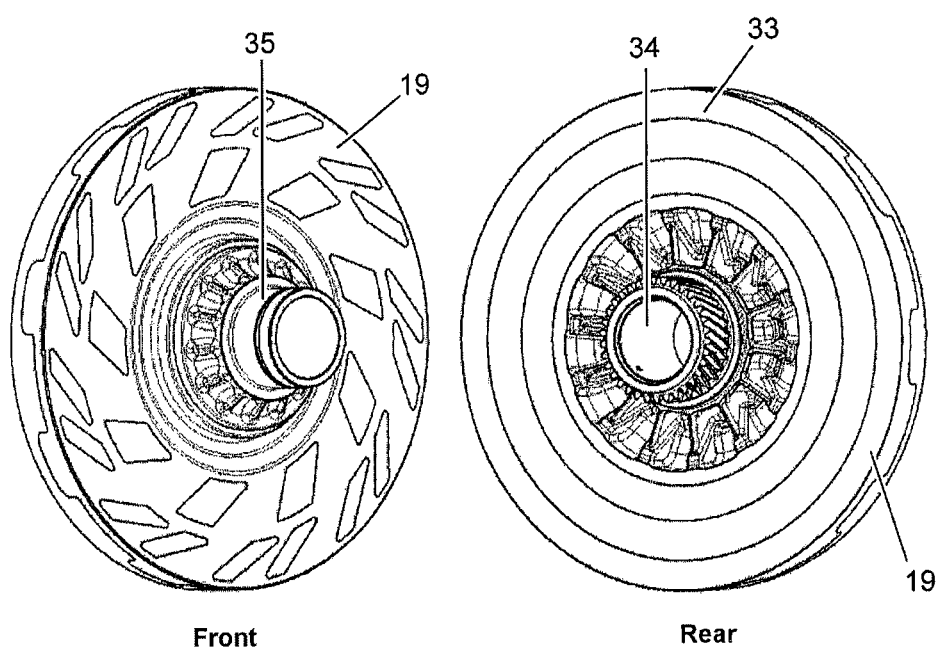
FIG. 6 shows various side views of an assembled pole wheel.

For functional reasons, an air gap that is as small as possible is used for converting the constant magnetic field from the magnetic ring (FIG. 4, item 28) to the pole wheel (FIG. 6, item 33) into an alternating magnetic field from the pole wheel to the fixed (stationary) induction ring 18 (FIG. 7, items 36-37) that is fixed for example by screws. In this case, it is irrelevant whether the pole wheel behaves dynamically or statically with respect to the magnetic ring. The constant magnetic field 51 is transferred without losses, apart from minor air gap losses, and even in the pole wheel is retained as a constant field in the region relatively close to the magnetic ring. The alternating field side 52 is subject to the laws of coercive force or magnetic reversal losses, the skin effect, or eddy current losses in the case of solid material.

For this, the following structural measures are provided on the pole rings. Arranged on the side facing the induction ring are at least two or more pole continuations (FIG. 5, items 31 and 32), which may be formed either edges offset at an angle or running parallel. There is no particular rule for the design of the pole continuations, the form of the design of the specific pole formation decisively influencing the magnetic potential with regard to driving and braking. It is also conceivable to choose an unsymmetrical number of poles between the inner ring and the outer ring. In order that the pole rings are kept in position, a carrier material (FIG. 5, item 30) is provided, also forming the receptacle on both sides of the mounting (FIG. 6, item 35) or on one side a gear wheel (FIG. 6, item 34), preferably for a planetary gearing. The pole ring carrier has to provide the required stiffness for receiving all of the magnetic forces acting on the pole rings.

Advantageously, the pole ring carrier (FIG. 5, item 30) consists of non-magnetic material, but may also be configured as electrically conducting or electrically insulating. This also applies to the pole rings (FIG. 5, items 31 and 32), which, like the pole ring carrier, may be configured as electrically conducting or non-conducting.

This depends on the respective thermal output potential desired. In the case of electrically conducting materials and solid components, eddy currents that significantly increase the heating output are induced not only in the induction ring but also in the pole wheel.

The induction ring (FIG. 7, item 36) undergoes similar structuring to the pole rings. Here, too, depressions are formed in the form of pockets, which prevent a homogeneous formation of the magnetic field. The more homogeneous the magnetic field is formed in the induction ring, the greater the tendency to braking.

Figure 7:
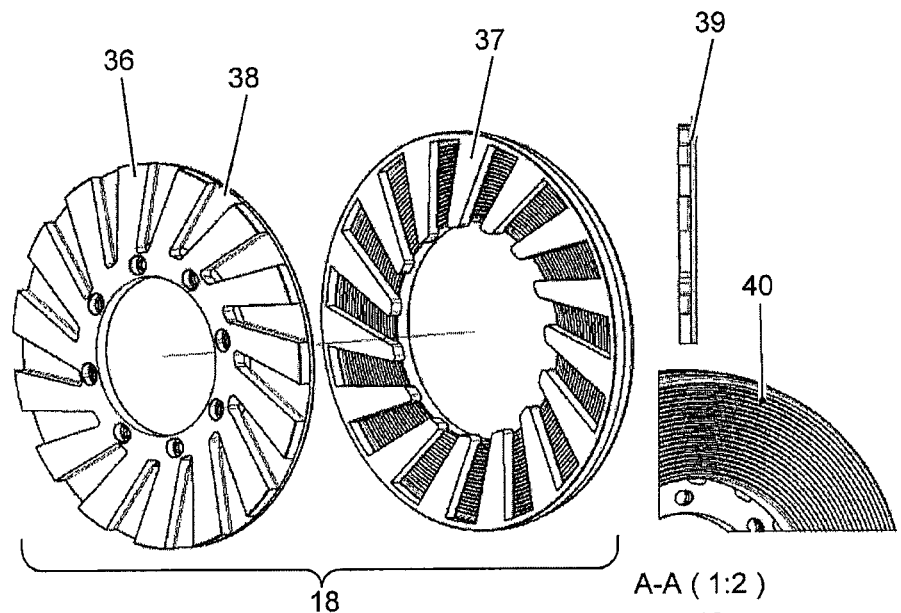
FIG. 7 shows an exploded representation of an induction ring.

In order to boost the eddy current intensity, the pockets (FIG. 7, item 38) in the induction ring are filled with a good electrically and thermally conductive material (FIG. 7, item 37). Also, a layer (FIG. 7, item 39) of the same material is applied on the side facing away from the poles. There is no particular specification for the thickness of this layer (s=var.). The better the conductivity of the material and the thicker the layer, the greater the eddy current formation in the material as a result of the thermal energy efficiency.

Also, by profiling the surface (FIG. 7, item 40) on the side facing the heat transfer medium, the applied layer is accordingly increased in size and the convection from the metal to the heat transfer medium is thereby improved significantly. It is also conceivable to form the induction ring without filling material. Although this brings about a deterioration of the heating output for the same primary energy expenditure, it does not influence the function itself.

Figure 9:
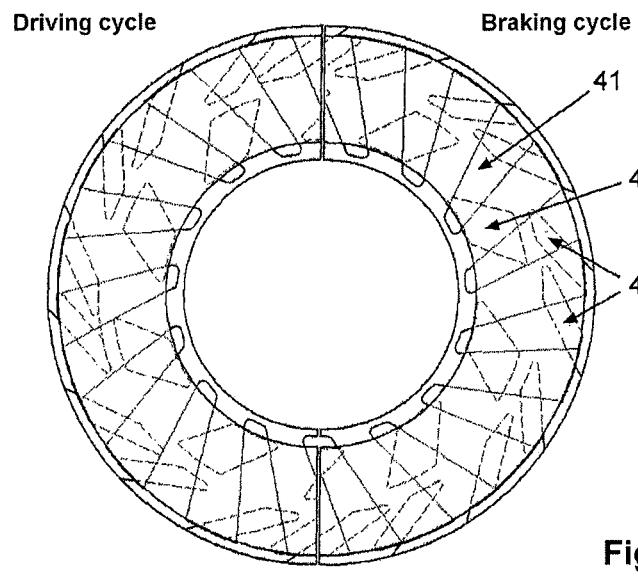
FIG. 9 shows a representation of a projection and contouring of the induction ring (solid lines), with respect to the contact of the pole wheel (dashed lines)

FIG. 9 shows a representation of an axial projection of the contour of the outer (axial) contours and their projections of the induction ring (solid lines) and of the pole wheel (dashed lines).

Figure 8:
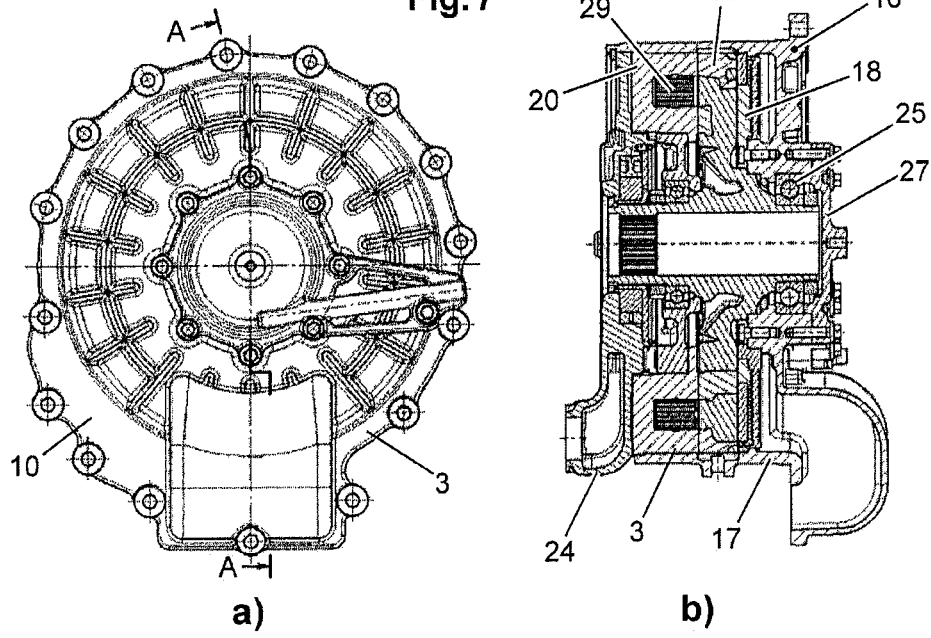
FIG. 8 shows a plan view and sectional representation through a heating unit according to the invention.

Shown in FIG. 8 is in the outer view and a sectional representation through a heating unit 10 according to the invention. In particular, the representation in FIG. 8b shows the compact set-up of the heating device according to the invention.

Figure 10:
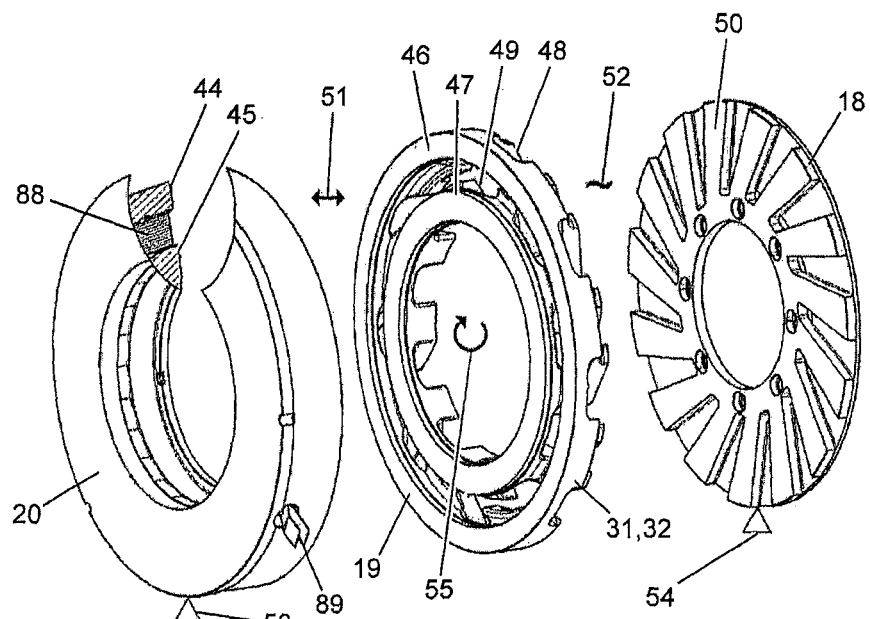
FIG. 10 shows an exploded representation of the magnetic ring with a direct-current coil, pole wheel and induction ring.

FIG. 10 shows an arrangement side-by-side for representing the magnetic flux in the magnetic space, the pole wheel 19, the magnetic ring 20 with the direct-current coil 29, 88, and also the induction ring 18.

In the case of the rotary induction heating device having a direct-current exciter according to the invention, a magnetic ring with a direct-current coil 20, as well as the induction ring 18 is static, that is to say arranged fixedly in the machine body, while on the other hand the pole wheel can perform a rotational movement as a dynamic part.

Between the magnetic ring 20 and the direct-current coil 88 on the one hand and the pole wheel 19 there is formed a constant magnetic field zone 51, while between the pole wheel 19 and the induction ring 18 there is formed an alternating magnetic field zone 52.

In FIG. 10, the direct-current coil 29 can be seen as a sheet-metal strip (winding) 88, with the corresponding power terminals 89.

The actual effect of the system is obtained when fundamentally contrary features, to be specific driving and braking of the pole wheel, complement one another. The number of driving and braking cycles per revolution determines the number of pole continuations of the pole wheel (FIG. 6) and the number of pockets in the induction ring (FIG. 7). The edges of the pole continuations of the pole rings (FIG. 5, items 31 and 32) are preferably counter to the edges of the pockets of the induction ring (FIG. 7, item 36). The angular position of the respective edges in relation to one another determines the difference between the braking torque and the driving torque (the angular position of the pole continuation of the pole rings on the one hand and of the edges of the pockets of the induction ring on the other hand that is represented in FIG. 9 are in this case particularly preferred, and to this extent the graphic representation in FIG. 9 also corresponds to the specific exemplary embodiment according to the invention). The driving torque continues to act until the magnetic moment between the inner and outer pole faces of the pole rings in relation to the pole faces of the induction ring is neutralized (m=0) (FIG. 9). After that, the braking energy acts in the reverse sense. The greatest energy efficiency prevails when both cycles are in temporal and kinetic equilibrium ($\Delta t \pm E_{kin}=0$). If the temporal equilibrium disappears into a temporal and kinetic disequilibrium ($\Delta t \pm E_{kin} \neq 0$) in the direction of the braking torque, the energy efficiency is reduced, and conversely the energy efficiency is increased.

Ideally, the ratio between driving and braking is 1:1.03 in favor of braking. The braking bias has the effect that the full exciter power can be obtained, and consequently the maximum heating output can be called into action. The greater the difference between the braking energy and the driving energy, the poorer the energy efficiency of the heating unit. Understandably, more external driving energy then has to be supplied to the system in order that the function is maintained.

In the driving cycle, additional kinetic energy is obtained from the mass inertia of all the rotating components, which correspondingly increases the rotational speed at the time from the driving energy. The rotational energy (or the inertia of the rotating mass) permanently acts against the braking energy.

If the driving power exceeds the braking power including the power loss (bearing friction and air circulation losses), the pole wheel steadily accelerates to beyond the critical rotational speed, and the heating unit would be damaged. Therefore, the exciter power has to be reduced until the rotational speed assumes the prescribed level. This results in a magnitude of the heating output that behaves equivalently to the difference between the braking power plus the power loss and the driving power. According to the invention, it is also conceivable to brake the pole wheel and in turn return the energy thereby obtained into the system. Serving for this is an additional device, in which the heat transfer medium is injected into the air gap between the pole wheel and the induction ring and thus braking takes place by frictional resistance. The injected amount of liquid can be made to suit the requirement exactly by way of an appropriate controller (FIG. 2, item 16).

According to the invention, it is also conceivable to produce a radial configuration (FIG. 12, items 68-75) instead of the preferred axial configuration. The greater production expenditure can be seen as a disadvantage of the radial configuration. The functional principle does not differ from the axial configuration.

The invention also makes use of the thermal effect of the excitation coil (FIG. 4, item 29) and introduces the thermal energy into the system by way of the cooling circuit of the coil.

Direct-current coils are ohmic resistors that convert the introduced electrical energy 100% into thermal energy.

In order to remove the heat efficiently from the heat sources (temperature sources) of the induction ring and the pole wheel by way of the heat transfer medium, the invention provides for example a pump (FIG. 3, item 24). The pump is preferably formed as a G-rotor pump; an inner pump impeller is driven directly by an adapter driver (FIG. 2, item 15) by way of the axle of the pole wheel.

Suitable as the heat transfer medium in the heating-unit/heat-exchanger heat circuit (FIG. 2, items 11-13) is preferably standardized and preferably thermally stable high-temperature oil. Any other liquid capable of lubrication is also conceivable. Oil has the advantage that the lubrication of the mounting and the pump do not have to be carried out separately and no sealing is required between the oil and the water. Moreover, oil has a much higher boiling point than water. The high boiling point of the oil allows high temperatures in the heat circuit, and therefore no excess pressure occurs. That advantageously saves costly measures for excess pressure. According to the invention, it is also conceivable to use the heat transfer medium with a lower boiling point, for example water, if the components and sealing measures are correspondingly designed to prevent excess pressure.

The invention also provides temperature cascades in the heating system. The heating unit forms a cascade 1 with a possible oil temperature of up to 250° C.; a heat exchanger and a mixing box form a cascade 2 with a possible water temperature of up to 99° C.; the actual heating circuit forms a cascade 3 with the customary water temperature of 30-60° C. This is based on the premise that no more energy, less higher thermal radiation energy, has to be expended for generating the excess temperatures than in the case of current customary circulating temperatures of a maximum of 60°. The cascade technique additionally increases the energy efficiency.

The transfer of the heat from the high-temperature oil in the first cascade to another medium, for example water, in the second cascade takes place by way of a customary heat exchanger, and also provided for this is in particular an oil-water separator 13, so that the various thermal media circuits do not have any material connection to one another, and consequently the thermal media cannot mix with one another.

Figure 11:
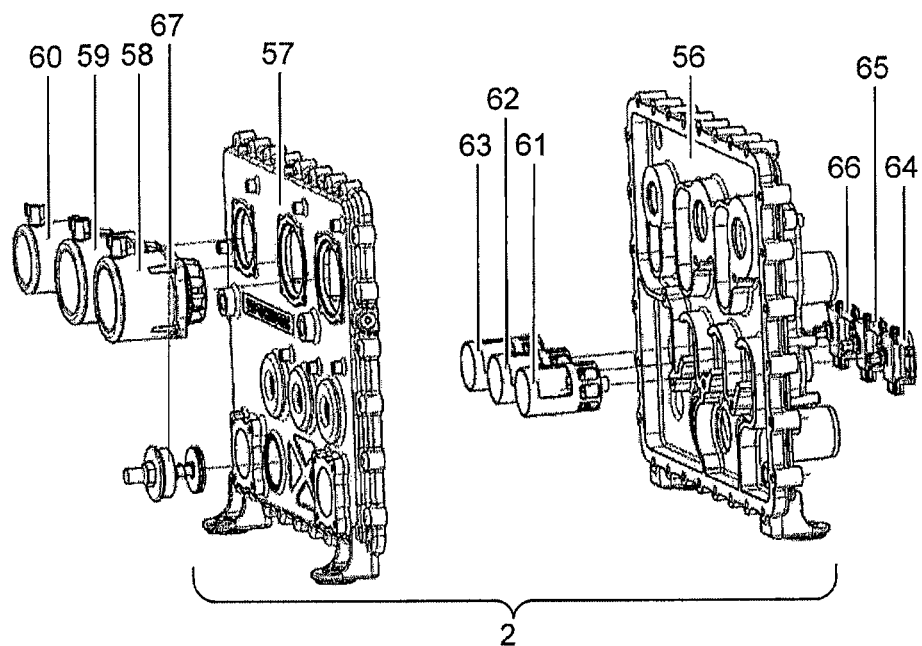
FIG. 11 shows an exploded representation of the mixing box according to FIG. 1.
Figure 16:
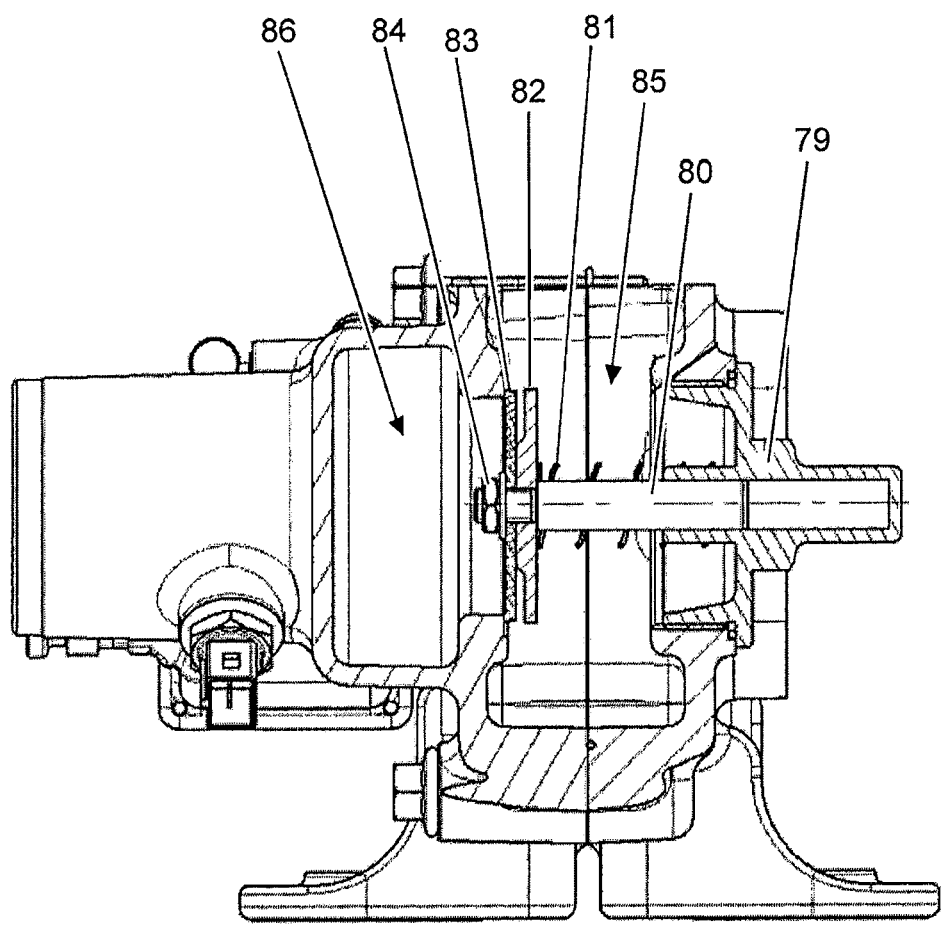
FIG. 16 shows a sectional representation through a check valve.

From the viewpoint of the thermal radiation losses with open pipework, where the water mixers and circulating pumps are also given an open form of construction, the invention provides a more compact type of construction in the form of a mixing box (FIG. 11, items 56 and 57). The hot/cold water mixing appliance (FIG. 11, items 61-63 and 64-66) and similarly the circulating pumps (FIG. 11, items 58-60) form a unit. By contrast with the open pipework, such a type of construction can thus be protected much more efficiently from high thermal radiation. The compact type of construction of the mixing box has the prerequisite as compared with conventional installation that the return of water from the heating circuits to the hot water in cascade 2 is controlled by means of a check valve (FIG. 16, items 79-86). The check valve prevents cold water from the return not being able to mix directly with hot water from the heat exchanger reservoir, but instead flows by way of the mixing device.

The covering hood (FIG. 1, item 8) with heat-insulating lining additionally reduces the thermal radiation of the heating device according to the invention.

The invention is based on the fact that external electrical and kinetic energy has to be permanently supplied. A conventional electric motor (FIG. 2, item 14) preferably serves as the electrical-kinetic energy supply. It is also conceivable to choose any other form of external kinetic energy supply, for example an internal combustion engine. The motor accelerates the pole wheel to a predetermined (effective) rotational speed, preferably 3000 rpm. The main task of the motor is to permanently introduce the kinetic differential energy between braking and driving. If the energy bias tends toward braking, the motor is active; if the energy bias tends toward driving, the motor is inactive.

The motor is preferably liquid-cooled and the cooling circuit of the motor is for example incorporated in the heating circuit. Consequently, this also allows lost energy to be used for the heating system.

Figure 15:
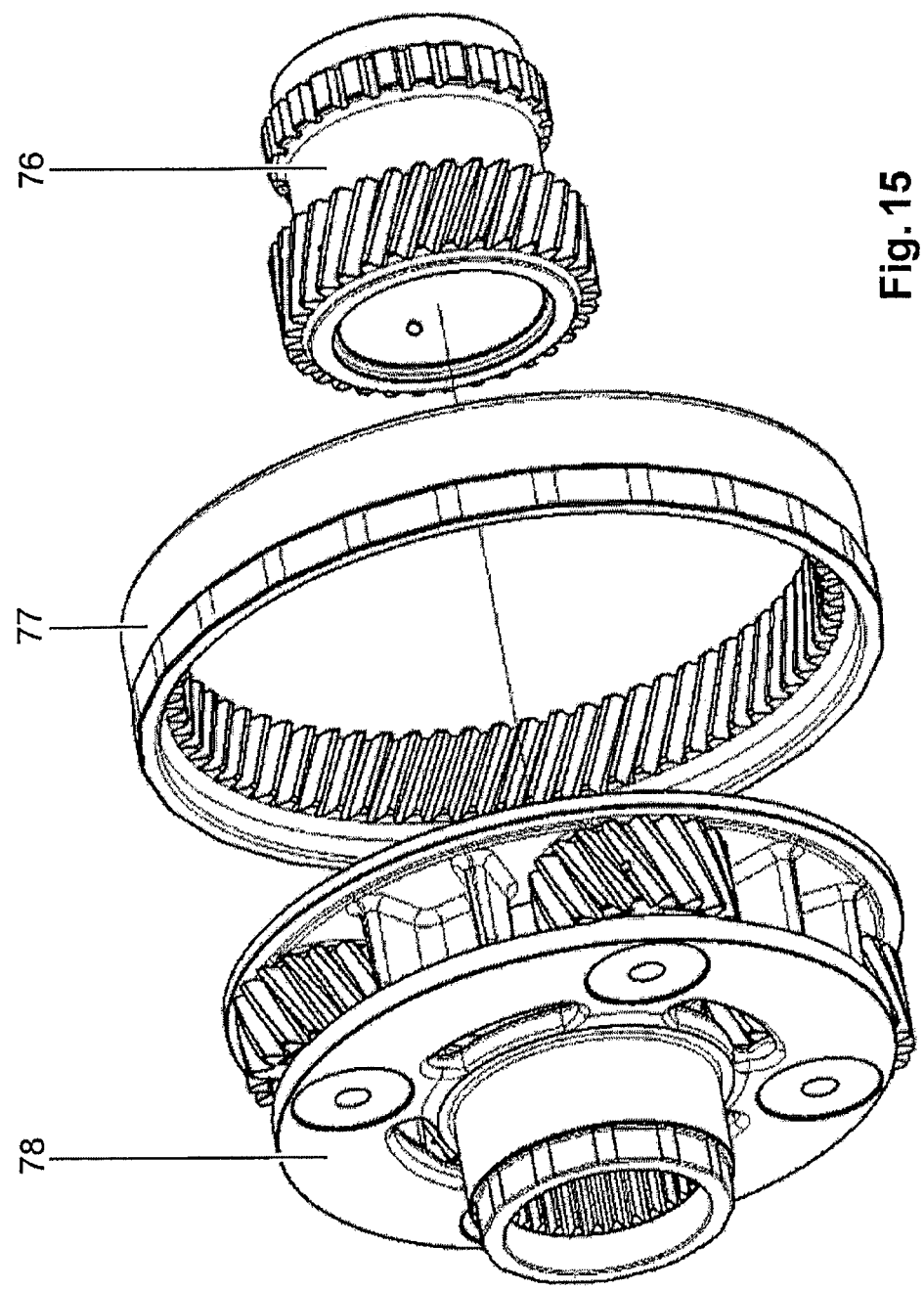
FIG. 15 shows an exploded representation of a planetary gearing.

Direct current is provided as the electromagnetic energy supply. Both, the electric motor and the direct current coil, preferably use a customary power supply as a source. The origin of the energy source is not the subject of the invention. However, a regenerative energy source is preferred 3000 rpm is a preferred rotational speed, obtained from two-pole electric motors at 50 Hz system frequency without control measures. According to the invention, it is also conceivable to increase or lower the rotational speed, for example by means of inverter control. If it is a matter of lowering the rotational speed, that is no problem in terms of energy because magnetic reversal losses in the electric motor are lowered by reducing the frequency, and as a result benefit the system. If the rotational speed is increased, mechanical measures are more advantageous. When the rotational speed is increased by means of frequency conversion in a converter, magnetization reversal losses and the excitation current in the electric motor increase. That means greater energy consumption than energy benefit. Therefore, the invention may provide a mechanical gear mechanism (FIG. 15, items 76-78), preferably as a planetary gearing. The gear mechanism on the input side takes the drive shaft of the drive and on the output side for example directly drives the pole wheel.

The invention sees in the speed increase an increase of the heating output with the same overall size. Unlike in the case of electrical machines, where the magnetization reversal losses increase and the energy efficiency decreases due to increasing the frequency, here the eddy current density increases, and consequently so too does the thermal efficiency.

It is also conceivable to increase and permanently set the efficiency of the heating unit by means of self-learning software. In the case of conventional "heating systems", where fossil or renewable sources of energy are burned, the combustion temperature can only be influenced a little or not at all. This similarly applies to heat pumps and solar technology; here, too, the energy stored in the transfer medium of air, water, earth and sun cannot be influenced by the heating unit itself.

The situation according to the invention is different than in the case of the aforementioned systems. Here, an increase of the energy efficiency is very well possible by intervening in fundamental mechanical and physical structures. In the case of the electric motor, the primary electrical energy can be effectively influenced by way of the rotational speed and load characteristics. Similarly in the case of the heating unit, there are also possibilities for increasing energy efficiency. It can be easily found at which rotational speed the magnetization reversal losses are smallest, there is the greatest magnetic penetration depth and, as a result, the best eddy current formation. All of the factors together produce a further improvement of the energy efficiency.

The maximum efficiency of the rotary induction heater having a direct-current exciter according to the invention is 98%; some slight convection losses are unavoidable.

The invention is aimed at achieving a high energy efficiency (coefficient of performance or annual working time) >10. The high coefficient of performance is in this case based on a magnetic potential characterized in iron (vector potential intB×Hdiv or intH×Bdiv) from the direct-current excitation, that is converted in the system in the form of magnetic force $F=F_E+F_B$ into kinetic energy. Kinetic energy for this comes from the drive, to keep the pole wheel running.

Both together produce kinetic energy, less the driving losses.

This kinetic energy is in turn divided into driving energy and braking energy. It produces a delta (varying), from which the quantities of the external energy to be introduced (or power output) can be calculated.

To allow the system to be configured in the best way possible, the magnetic material, the constant magnetic field and the conversion of a constant magnetic field an alternating magnetic field by means of the mechanical device play an essential role.

The high magnetic saturation by means of low magnetic field strength results in a narrow hysteresis curve. The narrow hysteresis curve means that the magnetic potential is low. Conversely, the higher the magnetic potential, the higher also the external exciter power (current×voltage) that has to be introduced and, as a consequence, a reduction of the performance time.

Similarly, high magnetic potential also causes high hysteresis losses (magnetization reversal losses), which disadvantageously reduce the eddy current formation in the induction ring in the system, but advantageously have only slight effects in the system.

According to Ohm's law, the eddy current density determines the thermal power density.

Some examples of this: with pure iron, a coefficient of performance of >10 is achievable. Transformer plate or cast steel, a coefficient of performance of 1.5 is achievable; with alloyed steel sheet, a maximum coefficient of performance of 1.3 is achievable.

The magnetic valency of pure iron to conventional magnetic materials:

for pure iron, at 1.6 T (tesla) about 10 A/m are required; for transformer plates and cast steel, at 1.6 T (tesla) 4000 A/m are required; for alloyed steel sheet, at 1.6 T (tesla) 6000 A/m are required; for cast iron, at 1.2 T (tesla) 21000 A/m are required.

The figures given make it clear how much more exciter power is necessary to arrive at the magnetic flux density of 1.6 T (tesla) with the same number of turns.

As mentioned, pure iron has a very high degree of saturation (2.5 T as compared with 1.7 T in the case of transformer plate), a narrow hysteresis curve and a low magnetic potential. This leads to the conclusion that pure iron can only be magnetized by means of a constant field, because, according to the induction law, with the alternating field the induction is accompanied by an almost equivalent counter-induction. Therefore, a small exciter current flows and the magnetic field significantly loses valency.

If the alternating magnetic field is generated by way of a mechanical component, the coil is not subject to induction/counter-induction. By contrast, the small magnetic reversal losses allow the formation of a high eddy current, and as a result the high thermal output.

A similarly important role is played by the geometry of the pole wheel and the induction ring. This determines the ratio of driving to braking. Because this means that only the delta determines kinetic energy to be applied, it is important to achieve a smallest possible delta. The level of the internal kinetic energy, resulting from the magnetic force, has no influence on the coefficient of performance, and is also in this case irrelevant. Only the eddy currents determine the thermal energy, and not the kinetic energy. Similarly, because of the vectorial subordination in the geometry, the eddy currents also determine the potential energy from the magnetic moment ($E_{pot}=-m \times B=-m\ B\ \cos \Theta$)

That is to say that no direct relationship between the magnetic moment and the torque is evident. This freedom is also desired as such, since it determines the level of the power efficiency.

Pure iron as an ideal magnetic material is particularly distinguished by the magnetic saturation and the permeability being very high. There are also other high-frequency magnetic materials that come very close to pure iron. For this reason, according to the present application, the terms pure iron also includes those materials that have a magnetic saturation of >1.5 T and an initial permeability ÜA of >6000.

Figure 12:
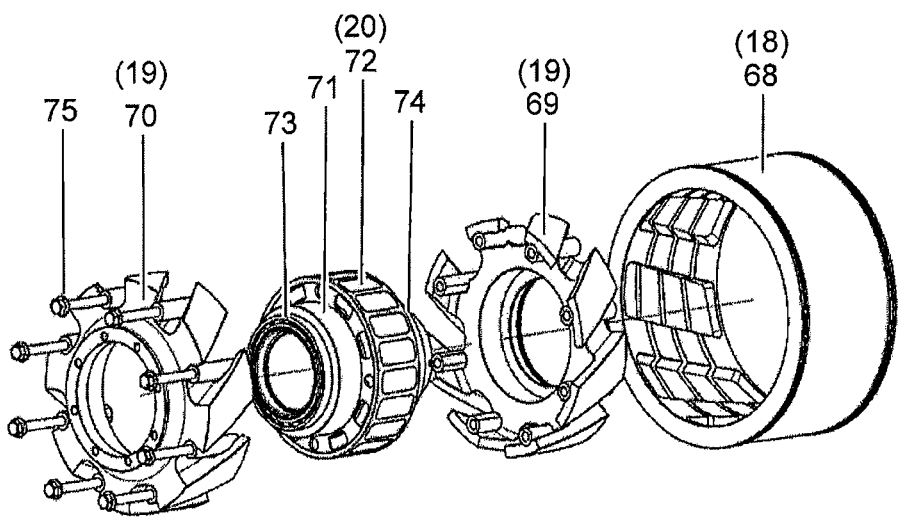
FIG. 12 shows an exploded representation of an induction ring with an ideal magnetic flux.

FIG. 12 shows an alternative form of the induction ring, though not as previously with an axial magnetic flux (see FIG. 10), but a radial magnetic flux.

In this case, the induction ring 68 has a rear claw-pole rotor half 69, and consequently a screwable front claw-pole rotor half 70, which form the pole wheel and which in turn receive a pole core 71 with an exciter coil 72, a movable bearing 73 and a supporting bearing 74, and consequently from a magnetic ring with a direct-current coil.

Figure 13:
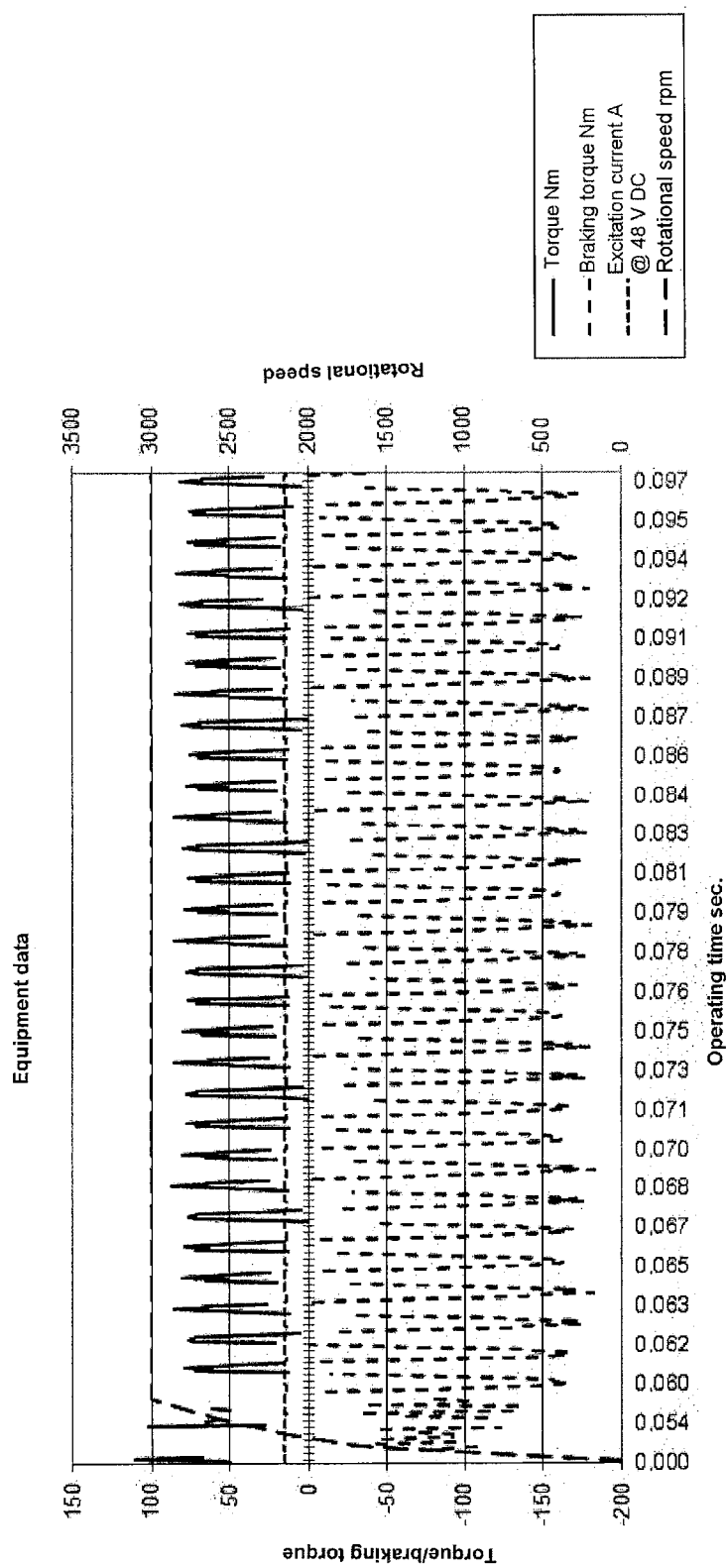
FIG. 13 shows a representation of a torque/braking torque diagram.

FIG. 13 shows an example of a torque/braking torque range diagram, in which the variation of the torque, the braking torque, the exciter current (the direct-current coil) and also the rotational speed are plotted.

For example, the ratio of driving torque to braking torque is approximately 1 to 3.45 in favor of braking.

Figure 14:
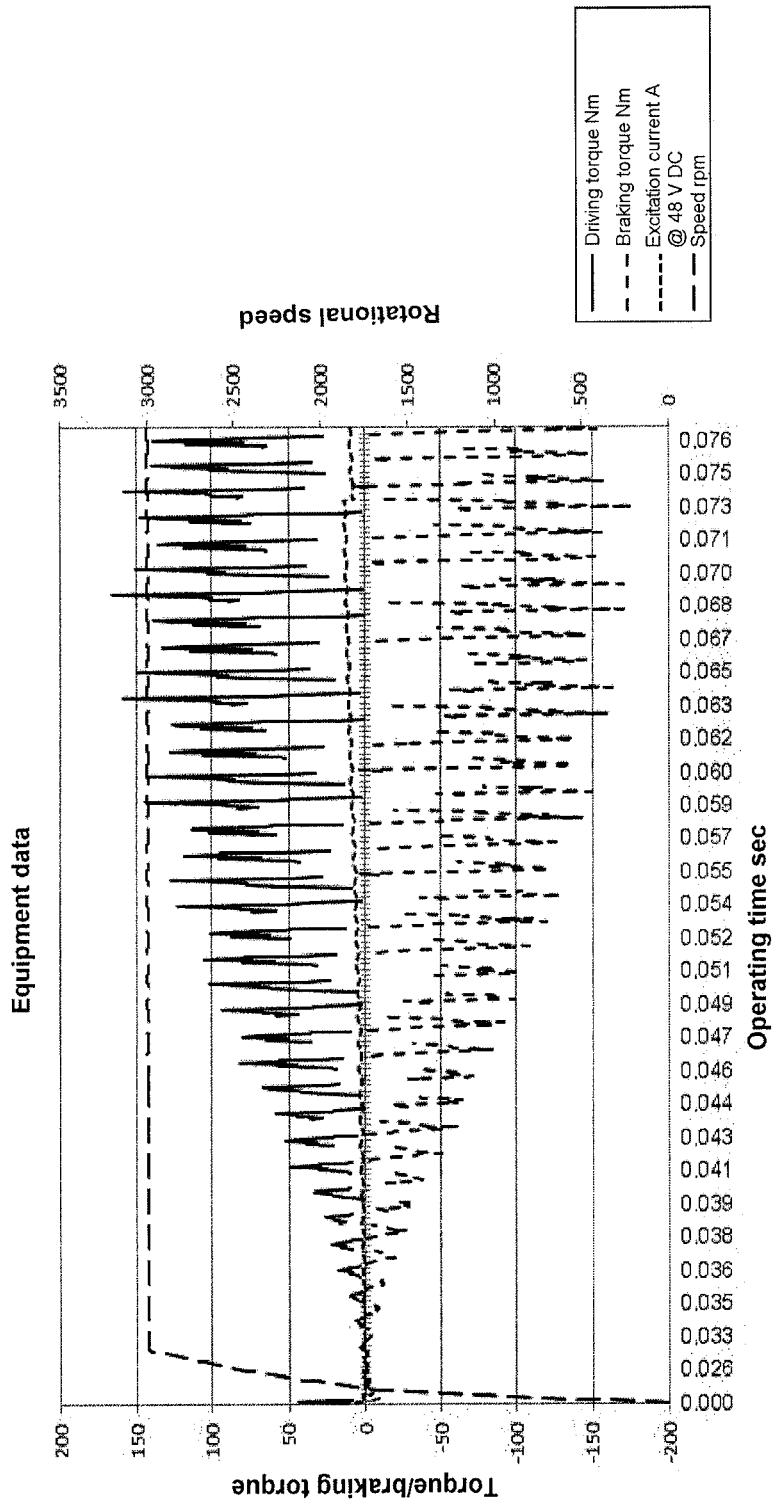
FIG. 14 shows a representation of an alternative torque/braking torque diagram to FIG. 13.

An example according to FIG. 14 is a change of the ratio of driving torque to braking torque in the ratio of 1 to 1.102 in favor of braking.

It is therefore evident that, by shifting the ratios of the driving torque to the braking torque, quite considerable interventions can be made into the control of the device, and consequently also into the generation of the heating output.

As stated above, the heating unit according to the invention is distinguished by a multipart set-up of components arranged axially one behind the other, to be specific a magnetic ring with a direct-current coil, a pole wheel and an induction ring, the magnetic ring and the induction ring being formed as fixed, while the pole wheel is formed as rotatable, and consequently a constant magnetic field is formed between the magnetic ring with the pole wheel, while an alternating magnetic field is formed between the pole wheel and the induction ring.

Designations

1 Heating unit with heat exchanger
2 Mixing box for providing hot/cold water
3 Basic frame
4 Heat-insulating and sound-damping mat
5 Control electronics
6 Rear wall
7 Heat-insulating and sound-damping mat for rear wall
8 Heat-insulating and sound-damping hood
9 Indicating and operating element
10 Heating unit
11 Upper heat exchanger housing
12 Lower heat exchanger housing
13 Oil-water separator
14 Starting motor
15 Heating unit-starting motor coupling
16 Controller for oil injection volume
17 Housing of the heating unit
18 Induction ring 19 Pole wheel
20 Magnetic ring with direct-current coil
21 Supporting bearing hub
22 Supporting bearing
23 Clamping nut of the supporting bearing
24 Oil pump
25 Guiding bearing
26 Clamping nut of the guiding bearing
27 Front cover
28 Magnetic ring
29 Direct-current coil
30 Pole ring carrier with bearing stub
31 Outer pole ring
32 Inner pole ring
33 Pole wheel
34 Sun gear of the planetary gearing
35 Receiving stub of the guiding bearing
36 Magnetic body of the induction ring
37 Filling body of the induction ring (non-magnetic)
38 Depression for magnetic field interruption
39 Integrated sheet of electrically/thermally conducting material
40 Groove profiling to increase the size of the convection area
41 Depression in the induction ring
42 Pole continuation on pole ring, raised on inside
43 Pole continuations on pole ring, raised on outside
44 Magnetic field leaving area on the magnetic ring (constant field)
45 Magnetic field entering area on the magnetic ring (constant field)
46 Magnetic field entering area on the pole wheel (constant field)
47 Magnetic field leaving area on the pole wheel (constant field)
48 Magnetic field leaving area on the pole wheel outer ring (alternating field)
49 Magnetic field leaving area on the pole wheel inner ring (alternating field)
50 Magnetic field entering area on the induction ring (alternating field)
51 Constant magnetic field zone
52 Alternating magnetic field zone
53 Magnetic ring, static arrangement
54 Induction ring, static arrangement
55 Pole wheel, dynamic arrangement
56 Front mixing box housing
57 Rear mixing box housing
58 Circulating pump of heating circuit 1
59 Circulating pump of heating circuit 2
60 Circulating pump of boiler
61 Mixing piston of heating circuit 1
62 Mixing piston of heating circuit 2
63 Mixing piston of boiler heating circuit
64 Servomotor for mixing piston of heating circuit 1
65 Servomotor for mixing piston of heating circuit 2
66 Servomotor for mixing piston of boiler heating circuit
67 Check valve of water mixer
68 Induction ring
69 Rear claw-pole rotor half
70 Front claw-pole rotor half
71 Pole core
72 Exciter coil
73 Movable bearing
74 Supporting bearing
75 Screws of claw-pole rotor
76 Sun gear
77 Ring gear
78 Set of planetary gears
79 Valve screw fastening
80 Valve piston
81 Valve spring
82 Pressure plate
83 Seal
84 Clamping nut
85 Cascade 3, cold water returned from heating circuits 1 and 2
86 Cascade 2, hot water reservoir
87 Slot in the magnetic ring
88 Sheet metal strip
89 Power supply terminal for direct-current coil
90 Opening in the magnetic ring

The invention claimed is:

1. A rotary induction heater with direct-current excitation for heating solid, liquid or gaseous substances, comprising:
a magnetic ring comprising a direct-current coil configured to generate a constant magnetic field; and
a rotating mechanical component configured to convert the constant magnetic field into an alternating magnetic field;
wherein the magnetic ring is fixedly connected to a housing of the rotary induction heater,
wherein the magnetic ring is adjoined in an axial direction by a rotatable pole wheel, the rotatable pole wheel having an inner pole ring and an outer pole ring,
wherein the rotatable pole wheel is adjoined in the axial direction by an induction ring,
wherein the constant magnetic field is formed between the magnetic ring and the rotatable pole wheel,
wherein the alternating magnetic field is configured for generating inductive heat and is formed between the rotatable pole wheel and the induction ring, and
wherein the generated heat occurs primarily in the induction ring and secondarily in the rotatable pole wheel.

2. The rotary induction heater with direct-current excitation as claimed in claim 1,
wherein the generated heat is transferred from the induction ring and the rotatable pole wheel into the solid, liquid or gaseous substances.

3. A rotary induction heater with direct-current excitation or heating solid, liquid or gaseous substances, comprising:
a magnet ring comprising a direct-current coil configured generate a constant magnetic field; and
a rotating mechanical component configured to convert the constant magnetic field into an alternating magnetic field;
wherein the magnetic rims fixedly connected to a housing of the rotary induction heater,
wherein the magnetic ring is adjoined in an axial direction by a rotatable pole wheel, the rotatable pole wheel having an inner pole ring and an outer pole ring,
wherein the rotatable pole wheel is adjoined in the axial direction by an induction ring,
wherein the constant magnetic field is formed between the magnetic ring and the rotatable pole wheel,
where in the alternating magnetic field is configured for generating inductive heat and is formed between the rotatable pole wheel and the induction ring,
wherein a kinetic differential energy for maintaining rotation of the rotatable pole wheel is applied by an electric motor,
wherein the generated heat is transferred in at least one cascade from a hotter region into a colder region so as to increase energy efficiency, and wherein a heat transfer media in a first cascade and a second cascade are spatially separated from one another by a component of a heat conducting material.

4. A rotary induction heater with direct-current excitation for heating solid, liquid or gaseous substances, comprising:
a magnetic ring comprising a direct-current coil configured to generate a constant magnetic field; and
a rotating mechanical component configured to convert the constant magnetic field into an alternating magnetic field;
wherein the magnetic ring is fixedly connected to a housing of the rotary induction heater,
wherein the magnetic ring is adjoined in an axial direction by a rotatable pole wheel, the rotatable pole wheel having an inner pole ring and an outer pole ring,
wherein the rotatable pole wheel is adjoined in the axial direction by an induction ring,
wherein the constant magnetic field is formed between the magnetic ring and the rotatable pole wheel,
wherein the alternating magnetic field is configured for generating inductive heat and is formed between the rotatable pole wheel and then induction ring; and
a hot-cold water mixing device comprising circulating pumps,
wherein the hot-cold water mixing device is integrated in the rotary induction heater.

5. A rotary induction heater with direct-current excitation for beating solid, liquid or gaseous substances, comprising:
a magnetic ring comprising a direct-current coil configured to generate a constant magnetic field, and
a rotating mechanical component configured to convert the constant magnetic field into an alternating magnetic field;
wherein the magnetic ring is fixedly connected to a housing of the rotary induction heater,
wherein the magnetic ring is adjoined in an axial direction by a rotatable pole wheel, the rotatable pole wheel having an inner pole ring and an outer pole ring,
wherein the rotatable pole wheel is adjoined in the axial, direction by an induction ring,
wherein the constant magnetic field is formed between the magnetic ring and the rotatable pole wheel,
wherein the alternating magnetic field is configured for generating inductive heat and is formed between the rotatable pole wheel and the induction ring,
wherein a kinetic differential energy for maintaining rotation of the rotatable pole wheel is applied by an electric motor,
wherein the generated heat is transferred in at least one cascade from a hotter region into a colder region so as to increase energy efficiency,
wherein in a cascade high-temperature oil used as a heat transfer medium and the heating is possible up to 250° C. without vapor forming; and
a check valve configured to prevent mixing of hot water from a reservoir in second cascade and cold water from a return from a third cascade,
wherein hot-cold water mixing is configured to take place by way of a hot-cold water mixing device.

6. A rotary induction heater with direct-current excitation for heating solid, liquid or gaseous substances, comprising:
a magnet ring comprising a direct-current coil configured to generate a constant magnetic field; and
a rotating mechanical component configured to convert the constant magnetic field into an alternating magnetic field;
wherein the magnetic ring is fixedly connected to a housing of the rotary induction heater,
wherein the magnetic ring is adjoined in an axial direction by a rotatable pole wheel, the rotatable pole wheel having an inner pole ring and an outer pole ring,
wherein the rotatable pole wheel is adjoined in the axial direction by an induction ring,
wherein the constant magnetic field is formed between the magnetic ring and the rotatable pole wheel,
wherein the alternating magnetic field is configured for generating inductive heat and is formed between the rotatable pole wheel and the induction ring; and
a control element,
wherein the control element implements self-learning software for modifying control sequences in order to improve energy efficiency.

7. A rotary induction heater with direct-current excitation, comprising:
a heating unit, comprising a magnetic ring with a direct-current coil for generating a constant magnetic field, the magnetic ring being adjoined in an axial direction by a rotatable pole wheel,
wherein the rotatable pole wheel comprises an inner pole ring and/or an outer pole ring, which comprise a magnetic material as filling material and which the pole wheel is adjoined to in the axial direction by a fixed induction ring,
wherein a constant magnetic field is formed between the magnetic ring and the rotatable pole wheel,
wherein an alternating magnetic field is formed between the rotatable pole wheel and the induction ring, and
the induction ring comprises depressions, which comprise a solid ferromagnetic material.

8. A rotary induction heater with direct-current excitation for heating solid, liquid or gaseous substances, comprising:
a magnetic ring comprising a direct-current coil configured to generate a constant magnetic field; and
a rotating mechanical component configured to convert the constant magnetic field into an alternating magnetic field;
wherein the magnetic ring is fixedly connected to a housing of the rotary induction heater,
herein the magnetic ring is adjoined in an axial direction by a rotatable pole wheel, the rotatable pole wheel having an inner pole ring and an outer pole ring,
wherein the rotatable pole wheel is adjoined in the axial direction by an induction ring,
wherein the constant magnetic field is formed between the magnetic ring and the rotatable pole wheel,
wherein the alternating magnetic field is configured for generating inductive heat and is formed between the rotatable pole wheel and the induction ring,
wherein kinetic energy is used to convert the constant magnetic field into the alternating magnetic field,
wherein the kinetic energy is divided into driving energy and braking energy, the kinetic energy converted into electrical energy in the form of eddy currents, and
wherein the eddy currents are converted completely or as far as possible into heat,
wherein the generated heat occurs primarily in the induction ring and secondarily in the rotatable pole wheel.

* * * * *

UNITED STATES PATENT AND TRADEMARK OFFICE
CERTIFICATE OF CORRECTION

PATENT NO. : 11,785,679 B2
APPLICATION NO. : 16/472451
DATED : October 10, 2023
INVENTOR(S) : Andreas Seiwald Page 1 of 1

It is certified that error appears in the above-identified patent and that said Letters Patent is hereby corrected as shown below:

In the Claims

In Claim 3, Column 12, Line 50, the word "rims" should be corrected to read as --wherein the magnetic ring fixedly connected to a housing--.

In Claim 3, Column 12, Line 59, the word "where in" should be corrected to read as --wherein the alternating magnetic field is configured for--.

In Claim 4, Column 13, Line 5, the word "beating" should be corrected to read as --for heating solid, liquid or gaseous substances, comprising:--.

In Claim 5, Column 13, Line 29, the word "beating" should be corrected to read as --for heating solid, liquid or gaseous substances, comprising:--.

In Claim 8, Column 14, Line 45, the word "herein" should be corrected to read as --wherein the magnetic ring is adjoined in an axial direction--.

Signed and Sealed this
Eighteenth Day of November, 2025

John A. Squires
*Director of the United States Patent and Trademark Office*